United States Patent [19]

Bardonnet et al.

[11] 4,066,553

[45] Jan. 3, 1978

[54] APPARATUS WITH SUPPORTED TUBULAR MEMBRANES FOR THE TREATMENT OF FLUIDS

[75] Inventors: Claude Bardonnet, Lyon; Robert Brun, Bollene; Michel Pages, D'Ardeche, all of France

[73] Assignee: Rhone-Poulenc Industries, Paris, France

[21] Appl. No.: 622,443

[22] Filed: Oct. 14, 1975

[30] Foreign Application Priority Data

Oct. 15, 1974 France .................................. 74.34611

[51] Int. Cl.² .................... B01D 13/00; C02B 1/74; C02B 1/82
[52] U.S. Cl. ............................ 210/321 R; 210/433 M; 210/490; 210/497 R
[58] Field of Search ............... 210/321 R, 433 M, 490, 210/497, 456

[56] References Cited

U.S. PATENT DOCUMENTS

| 3,616,928 | 11/1971 | Rosenblatt ........................... 210/321 |
| 3,768,660 | 10/1973 | Block .................................... 210/321 |
| 3,834,546 | 9/1974 | Brun et al. ......................... 210/490 X |
| 3,838,776 | 10/1974 | Brun et al. ........................... 210/321 |
| 3,963,622 | 6/1976 | Baudet et al. ................... 210/321 R |

Primary Examiner—Frank A. Spear, Jr.
Assistant Examiner—D. R. Sadowski
Attorney, Agent, or Firm—Stevens, Davis, Miller & Mosher

[57] ABSTRACT

Apparatus of all types for the separation of fluids which comprise at least one semi-permeable tubular membrane mounted on a porous support, the membrane being kept out of contact with adjacent parts of the apparatus by at least one thread-like element wound spirally around the membrane.

8 Claims, 1 Drawing Figure

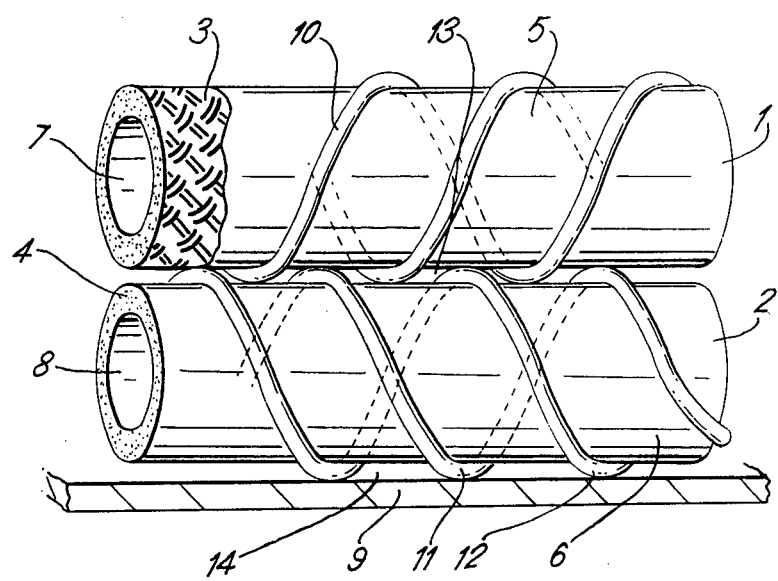

APPARATUS WITH SUPPORTED TUBULAR MEMBRANES FOR THE TREATMENT OF FLUIDS

The present invention relates to apparatus for the treatment of fluids which comprise at least one semi-permeable tubular membrane resting on a flexible porous internal support. Such apparatus is used either as an exchanger between two fluids or as a separator of liquid or gaseous fluids, in various applications such as reverse osmosis, ultra-filtration, gas permeation and dialysis.

Apparatuses for the treatment of fluids, equipped with semi-permeable tubular membranes resting on a flexible porous internal support are known. Such membranes are assembled, for example, in bundles or around bobbins. It has been found that when thus assembled they have a tendency to rest against one another. This, on the one hand, neutralises the parts of their surface which are in contact with adjacent membranes or with the walls of the apparatus and, on the other hand, interferes with the uniform circulation of the fluid around the membranes so that dead zones can form which, depending on the relative arrangement of the membranes, can cause a significant drop in the efficiency of the apparatus and makes the apparatus more prone to clog and more delicate to clean and, if required, to sterilise.

Attempts have been made to keep the tubular membranes apart by causing them to pass through spacer plates or by introducing around them a packing material such as a flexible foam with open cells, but this reduces the compactness of the apparatus, that is to say the ratio of useful membrane surface to the volume of the apparatus.

The present invention provides an apparatus for the treatment of fluids with flexible semi-permeable tubular membranes which, simultaneously, is very compact and has a high efficiency, especially a high flow rate of permeate, and, in turn, gives low pressure drops.

According to the present invention there is provided an apparatus for the treatment of fluids comprising at least one semi-permeable tubular membrane resting on a flexible porous internal support, the membrane being kept apart from the adjacent elements by at least one thread-like element wound spirally around the said membrane.

This invention will now be described, merely by way of example with reference to the FIGURE of the accompanying drawing which illustrates schematically, greatly magnified, a particular embodiment of the relevant part of an apparatus of this invention.

The FIGURE shows, in partial view and in perspective two contiguous membrane supports, in this case tubular, one of which is close to a wall of the apparatus.

Tubes 1 and 2 each consist of a flexible, substantially cylindrical, porous textile tubular support, 3 and 4 covered externally by a semipermeable membrane, 5 and 6, respectively. Each textile support is hollow and consists, for example, of one or more concentric layers of plaited threads which define axial channels 7 and 8, respectively. The tube 2 rests close to the wall 9 of the apparatus for the treatment of fluids, which contains all the tubes. For the tube 2, the tube 1 and the wall 9 of the apparatus are the adjacent elements. An apparatus comprising such tubes and walls is of known type; see, for example, French Pat. No. 2,234,912.

According to this invention, each membrane is encompassed, generally over its entire length, by at least one spiral thread-like element, 10. The direction of coiling of this element is not critical. Thus the membrane 6 is surrounded by two spiral threads 11 and 12 staggered by a half-pitch.

Each thread-like element can be applied by winding it spirally, in accordance with known processes, around a tubular membrane; it is generally fixed onto the latter at its two ends by any known means such as knotting, fusion of contiguous strands of a loop, glueing or sealing by a polymerisable resin, onto the membrane and/or onto the tip of the element itself. The remainder of the thread-like element rests freely on the membrane and is preferably firmly fixed thereto, either at various regularly spaced points or continuously, for example by glueing so as to preserve a substantially constant pitch regardless of the configuration of the tubular membrane.

To avoid possible friction of the thread against the membrane during subsequent deformations of the tubular membrane, which is generally flexible, it is advantageous to use processes which consist of spirally winding about the membrane threads which remain practically devoid of a twist about themselves, the twist of the thread being the deformation which this thread undergoes under the action of two opposing torques acting in planes at right angles to the thread. Thus, the threads can be turned by one turn about themselves for each turn of the thread around the tube, the turns being in opposite senses.

It is also possible to heat the thread, whilst it is being wound about the tube, to a sufficiently high temperature to stabilise it and eliminate its twist torque. By using a heat-shrinkable thread which is heat-shrunk after being wound spirally around the tubular membrane, it is possible to produce a hoop-like action on the membrane.

As can be seen from the FIGURE, the threads 10, 11 and 12 maintain a uniform free space 13 between the tubes 1 and 2. In the same way, the threads 11 and 12 also maintain a uniform free space 14 between the tube 2 and the wall 9 of the apparatus. The minimum width of this free space is generally substantially constant and equal to the diameter of the thread-like element, regardless of the configuration of the tubes.

It is thus possible, by selecting particular transverse dimensions for the spiral threads, to maintain, between the various tubular membranes, the minimum spacing required to allow satisfactory flow of the fluid on the outside of the membranes, thus making the apparatus very efficient, with a low pressure loss. This minimum spacing corresponds furthermore to the optimum compactness of the apparatus. In addition, this spacing persists over the entire useful length of the tubular membranes, regardless of their configuration, which may be, for example, parallel, coiled or twisted.

As the thread-like element, a flexible thread is generally used, the cross-section of which may be polygonal or elliptical but is preferably substantially circular. In effect, a round thread in general when subjected to an external mechanical pressure only rests against the membrane, without cutting it. This element can be a textile thread, generally of a synthetic material. Such a thread can comprise one or more strands or filaments.

The transverse dimensions of the thread-like element, which most frequently is the same as its diameter, are generally from one-fiftieth to one-half, preferably from one-twentieth to one-eighth, of the diameter of the tubular membrane.

The thread-like element is wound with a pitch which is generally from one-quarter to 8 times, and preferably from one-half to twice, the diameter of the tubular membrane. Advantageously, the pitch of the winding of the thread-like element will be the lower, the more flexible, and capable of exhibiting lower radii of curvature, the supporting tube is. It is possible to wind spirally several thread-like elements 11 and 12 and to distribute them uniformly over the surface of the tubular membrane.

The external diameter of the tubular membrane is usually from 1 to 20 millimeters and preferably from 2 to 10 millimeters; preferably, its diameter is relatively small so that a sufficiently compact apparatus can be made up. The porous support of the tubular membrane may be of any known type and preferably consists of a textile tube which offers a degree of flexibility which allows the tube to be bent to a radius of 2 or 3 centimeters to 20 or 30 tens of centimeters. It is possible to use flexible tubular membrane supports of all known types; the elements described in the French Pat. Nos. 2,179,640 and 2,194,461 are particularly suitable.

Of course, several tubular membranes, preferably each equipped with the thread-like elements, can form a bundle or hank which can itself be encompassed by one or more spirally-wound thread-like elements. This arrangement can, in particular, facilitate handling the tubular membranes during construction of the apparatus.

The use of thread-like elements wound spirally around flexible tubular membranes presents many other advantages. On the one hand, it makes it possible to construct an apparatus in which the tubular membranes can be tightly packed against one another; these membranes can thus be enveloped, for example in an impermeable or permeable heat-shrinkable sleeve.

On the other hand, the systematic spacing of the tubular membranes thus achieved facilitates producing sealing devices by casting a resin around the tubular membranes near their axial ends. Furthermore, the thread-like elements protect the membranes, especially when they are handled during manufacture of the apparatus, and also protect the membranes against rubbing in contact with the walls of the apparatus. In addition, the thread-like element can, in certain cases, exert a hoop-like effect on the tubular membrane. Again, it is found that the thread-like elements distribute and render uniform the flow of the fluids around the membranes and make it possible to reduce or eliminate preferential flows.

The apparatus according to the present invention makes it possible to carry out exchange operations involving dialysis, direct osmosis, liquid-gas exchanges and gas-gas exchanges, fluid separation operations involving ultra-filtration, reverse osmosis and gas permeation, and even mixing operations. These operations can of course in effect be concentration operations. Naturally, the apparatus is suitable for exchange applications such as heat exchange between two fluids, humidification and/or air conditioning, or mixing applications, for example dissolving certain gases in liquids.

We claim:

1. In an apparatus for the treatment of fluids which consists essentially of a plurality of flexible tubular porous supports on the outer surface of which is a semipermeable membrane the improvement wherein membranes on adjacent supports are kept out of contact with each other solely by separation means consisting essentially of one or more thread-like elements wound spirally around and on the membrane.

2. Apparatus according to claim 1, in which the thread-like element is firmly fixed to the membrane at least as regularly spaced points.

3. Apparatus according to claim 1, in which the thread-like element is made of heat-shrinkable material and has been heat-shrunk after winding around the membrane.

4. Apparatus according to claim 1, in which the thread-like element is when wound around the membrane, substantially free from twist about itself.

5. Apparatus according to claim 1, in which the pitch of the spiral winding of the thread-like element is from one-quarter to eight times the diameter of the tubular membrane.

6. Apparatus according to claim 1, in which the thread-like element is circular in cross-section and has a diameter from one-fiftieth to one-half of the diameter of the tubular membrane.

7. Apparatus according to claim 1, in which the tubular membrane has a diameter from 1 to 20 millimeters.

8. Apparatus according to claim 1, which comprises the tubular membranes arranged in at least one bundle, said bundle having at least one thread-like element wound spirally around it.

* * * * *